United States Patent [19]

Punshon et al.

[11] 4,295,268
[45] Oct. 20, 1981

[54] METHOD OF ASSEMBLING AN ELECTRIC MOTOR

[75] Inventors: William D. Punshon, Bridgeton; C. Theodore Peachee, Maryland Heights, both of Mo.

[73] Assignee: Emerson Electric Co., St. Louis, Mo.

[21] Appl. No.: 182,084

[22] Filed: Aug. 28, 1980

Related U.S. Application Data

[62] Division of Ser. No. 27,728, Apr. 6, 1979, Pat. No. 4,245,870.

[51] Int. Cl.$^3$ ............................................. H02K 15/02
[52] U.S. Cl. ...................................... 29/596; 310/42; 310/90
[58] Field of Search .................... 29/596, 598; 310/90, 310/42; 308/72, 22, 26, 29, 31, 72, 161, 162, DIG. 11

[56] References Cited

U.S. PATENT DOCUMENTS

| 3,302,048 | 1/1967 | Gray | 310/90 |
| 3,319,098 | 5/1967 | Hartman | 310/90 |
| 4,170,057 | 10/1979 | Roddy et al. | 29/596 |

Primary Examiner—Carl E. Hall
Attorney, Agent, or Firm—Polster, Polster and Lucchesi

[57] ABSTRACT

An electric motor having a stator assembly, a shaft, a rotor mounted on the shaft, and a pair of end shields secured to the stator assembly and journalling the shaft for rotation of the rotor within the stator assembly. The motor includes a pair of self-aligning bearings for transmitting both radial and thrust (i.e., axial) loads from the shaft to the end shields. Each of the end shields has an outwardly facing race. A first ball member is axially fixed with respect to the shaft and is journalled in the race of one of the end shields. A second ball member is axially movable along the shaft and is journalled in the race of its respective end shield. A pushnut or the like is provided to axially secure the second ball member to the shaft when the first and second ball members are journalled in their respective races thereby to substantially prevent axial movement (i.e., end play) of the rotor with respect to the stator assembly and to permit the transfer of axial loads in either direction from the shaft to the end shields. A method of assemblying a motor, such as above described, is also disclosed.

1 Claim, 1 Drawing Figure

METHOD OF ASSEMBLING AN ELECTRIC MOTOR

This ia a division of application Ser. No. 27,728 filed Apr. 6, 1979, now U.S. Pat. No. 4,245,870.

BACKGROUND OF THE INVENTION

This invention relates to electric motors, and more particularly to an improved motor in which the rotor assembly is journalled by a pair of self-aligning journal bearings in the end shields of the motor in such manner as to substantially eliminate end play of the rotor relative to the stator assembly.

Heretofore, in many motor applications, such as dishwasher motors or the like, the rotor assembly was oftentimes journalled by means of a pair of ball bearings (or other roller element bearings) which provided the desired low friction and thrust transfer capability required for the particular motor application. However, these ball bearings were considerably more expensive than bushing or journal-type bearings used in many other motor applications. Also, the end play (i.e., axial movement) of the rotor with respect to the stator assembly could vary considerably from motor to motor thus making it necessary to individually adjust (shim) the rotor with respect to the stator of each motor manufactured. This required additional time to manufacture the prior art motors thus increasing their cost. Also, certain elastomeric-backed washers were required to accommodate thrust loads in the motor and, again, these parts added to the complexity and cost of the prior art motors.

SUMMARY OF THE INVENTION

Among the several objects and features of this invention may be noted the provision of an electric motor in which the rotor is journalled in such manner that both radial and thrust loads may be readily and efficiently transferred from the rotor to the stator assembly (i.e., to the end shields of the motor);

The provision of such a motor in which the rotor may be readily journalled in place with respect to the stator assembly without the necessity of having to shim the rotor to a desired end play configuration;

The provision of such a motor in which the rotor is journalled with respect to the stator in such manner that axial movement or end play of the rotor is substantially eliminated or may be readily controlled;

The provision of such a motor in which the motor is journalled in sliding bearings (as opposed to rolling element bearings), and yet which runs cooler and with less wear than with prior art rolling element bearings;

The provision of such a motor in which limited amounts of axial misalignment of the rotor shaft relative to the stator assembly may be readily accommodated by the bearings journalling the shaft;

The provision of a method of assembling a motor, such as above described, in which end play of the rotor assembly may be readily and efficiently eliminated (or controlled to be within prescribed limits) and in which the bearings may be readily secured in place while securely journalled in their respective races; and The provision of such a motor which is economical to manufacture, which has a long service life, and which is reliable in operation.

Briefly, an electric motor of this invention has a stator assembly including a core with a bore therethrough. The motor further includes a rotor assembly having a rotor adapted to be rotatably mounted within the bore and a shaft extending endwise from the rotor in both directions. The shaft is coaxial with the rotor and the bore. A pair of end shields is provided which are adapted to fit on the stator assembly and to journal the rotor assembly. The motor includes a pair of self-aligning thrust bearings for rotatably journalling the rotor assembly, for accommodating a limited range of misalignment between the shaft and the stator assembly, and for transferring axial thrust loads in either direction from the shaft to the end shields. Each of these self-aligning thrust bearings comprises a ball member received on the shaft and a tapered socket race in a respective end shield, each of the socket races surrounds the shaft and faces outwardly of the motor. Means is provided for securing one of the ball members in a fixed position with respect to the shaft. The other ball member is movable axially along the shaft and means is provided for adjustably securing this other ball member in a desired axial position on the shaft in which the one ball member engages its race so that it journals the shaft and so that axial thrust may be transferred in one direction from the shaft to its respective end shield and in which the other ball member engages its race so that it also journals the shaft and so that axial thrust may be transferred in the other direction from the shaft to its respective end shield.

This invention further includes a method of assembling a motor such as described. In this method, the rotor is first inserted in the bore of the core with the shaft extending outwardly therefrom. A pair of bearing support members (i.e., end shields) is installed or fitted on the core, each of these bearing support members having an opening therethrough for reception of a portion of the shaft and having an outwardly opening tapered race surrounding the shaft. A first ball member is fixed in axial position on the shaft, this first ball member having a surface thereon adapted to be journalled in its respective race for the transfer of both radial loads and thrust loads in one axial direction from the shaft to the stator assembly. A second ball member is then installed on the shaft, this second ball member having a surface thereon adapted to be journalled in its respective race for the transfer of both radial loads and thrust loads in the opposite direction of the first ball member from the shaft to the stator assembly. With the first ball member seated in its race and the second ball member seated in its race, the second ball member is then axially secured to the shaft thereby to substantially prevent axial movement of the shaft and the rotor relative to the stator assembly. Other objects and features of this invention will be in part apparent and in part pointed out hereinafter.

BRIEF DESCRIPTION OF THE DRAWING

The drawing represents a vertical cross sectional view of an electric motor of the present invention with certain parts of the motor shown in phantom for the purposes of clarity.

Corresponding reference characters indicate corresponding parts in the drawing.

DESCRIPTION OF PREFERRED EMBODIMENTS

Figure 1:
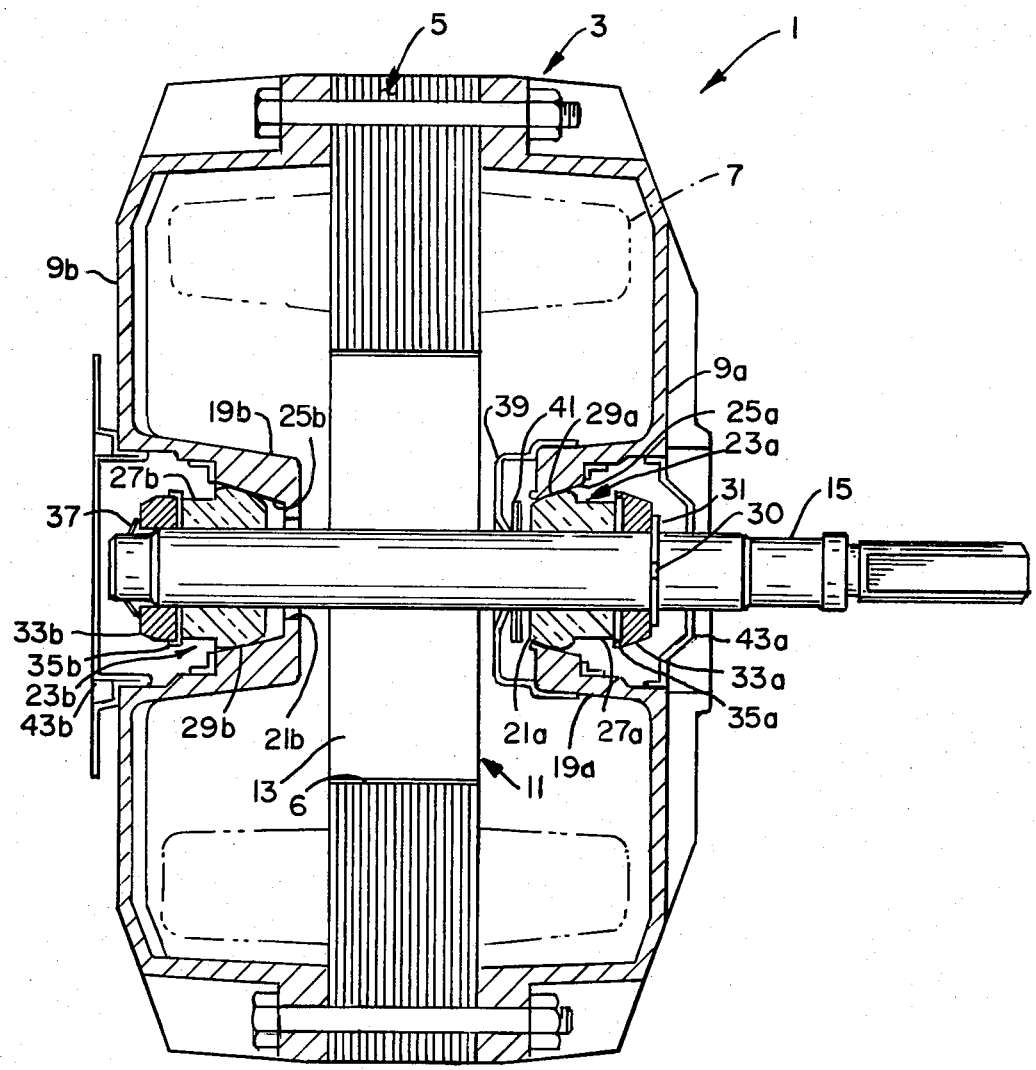

Referring now to the drawing, a motor of this invention is generally indicated in its entirety by reference character 1. The motor includes a stator assembly 3 including a core 5 made up of a stack of lamination plates of suitable magnetic material. The core has a bore 6 extending longitudinally therethrough and further has a plurality of coils of wire constituting stator windings 7 inserted in radial slots extending outwardly from bore 6 in the conventional manner. The stator assembly further includes a pair of end shields 9a and 9b (also referred to as bearing support members) which are fitted on core 5 and which are preferably secured thereto by bolts or screws which are inserted through or into the core.

The motor further includes a rotor assembly, as generally indicated at 11, including a rotor body 13 fixed on a rotor shaft 15. Shaft 15 extends axially outwardly from rotor body 13 on both sides thereof. It will be understood that rotor assembly 11 is conventional and preferably rotor body 13 is of a squirrel-cage type design having a plurality of magnetic laminations with suitable rotor conductor bars extending axially therethrough adjacent the periphery of the rotor body. End rings (not shown) are provided on the end faces of the rotor body for electrically connecting the rotor bars together.

Each end shield 9a, 9b has a respective central hub 19a, 19b which includes an opening 21a, 21b therethrough for reception of a respective outer end portion of shaft 15. The shaft is rotatably journalled within hubs 19a and 19b by means of self-aligning bearings 23a and 23b, respectively. Each of these self-aligning bearings includes a respective tapered, outwardly facing bearing surface or race 25a, 25b provided in respective hubs 19a and 19b and surrounding shaft 15. Further, these bearings include a so-called ball member 27a, 27b fitted on shaft 15. Each of these ball members has a respective part-spherical outer surface 29a, 29b which is socketed in its respective race for rotatably journalling the rotor assembly within the stator assembly (i.e., in end shield hubs 19a, 19b), for transferring axial thrust loads from the rotor assembly to the stator assembly, and for accommodating a limited degree of axial misalignment of shaft 15 relative to the stator assembly 3.

Further in accordance with this invention, one of the ball members, as indicated at 27a, is fixed in axial position relative to shaft 15. The shaft has a circumferential groove 30 therearound which receives a removable retainer 31 (preferably a snap ring). A thrust collar 33a is interposed between retainer 31 and the adjacent end of ball member 27a. For example, thrust collar 33a may be made of a suitable synthetic resin material. The thrust collar has a wear-resistant washer or thrust plate 35a of hardened steel or the like on its face adjacent ball member 27a thereby to permit the transfer of axial thrust loads from shaft 15 in one direction (inwardly of the motor or toward the left as shown in the drawing) to ball member 27a.

The other ball member 27b is movable in axial direction along shaft 15. This ball member is adjustably securable in axial position on shaft 15 in such manner that ball member 27a is journalled or socketed in its respective race 25a and further in such manner that ball member 27b is firmly journalled or socketed in its respective race 25b. More specifically, a thrust collar 33b (generally similar to thrust collar 33a heretofore described) is provided on the outer end of ball member 27b and a hardened steel washer or thrust plate 35b is provided between thrust collar 33b and ball member 27b. The ball member is axially secured to shaft 15 by means of a push nut 37 which is applied to one end of shaft 15 (i.e., the left end of the shaft as viewed in the drawing figure) so as to securely lock ball member 27b in its desired axial position with ball members 27a and 27b socketed in their respective races 25a and 25b. In this manner with the ball members firmly socketed in their respective races and with both ball members prevented from moving axially outwardly with respect to shaft 15, the shaft is rotatably journalled by the ball members in their respective races and axial movement of the shaft in either direction is prevented by the cooperation of the ball members, retainer 31 and pushnut 37, and their respective races 25a and 25b. Thus in accordance with this invention, it can be readily appreciated that shaft 15 has little or no end play (i.e., axial movement) with respect to the end shields.

It will also be appreciated that pushnut 37 may be so selected as to have a resilient flange or surface which engages thrust collar 33b and thus exerts some degree of resilient force on ball members 27a and 27b to resiliently hold them in their respective races. This also, of course, serves to further reduce any residual axial movement of shaft 15 relative to the end shields.

As is indicated at 39, a retaining cap is applied to the inner end of hub 19a so as to surround the shaft. An oil slinger disk 41 is affixed to the shaft and is rotatable therewith so as to return lubricating oil to bearing 23a. It will be appreciated that a suitable lubricating wick (not shown) may be installed within hubs 19a and 19b so as to provide adequate lubrication to bearings 23a and 23b. Also, suitable caps 43a and 43b are inserted into hubs 19a and 19b so as to protect bearings 23a and 23b from dust and other contaminants.

The method of this invention of assembling motor 1 will now be described. First, rotor assembly 11 is positioned within stator assembly 3 so that rotor body 13 is centered in bore 6. End shields 9a and 9b are then fitted on core 5 and bolted in place. Ball member 27a is then received on the right end (as viewed in the drawing) of shaft 15 and is moved inwardly for reception in its respective race 25a. Thrust collar 33a with thrust washer 35a mounted thereon is then inserted on the shaft and moved into engagement with the outer end of ball member 27a. Then, retainer ring 31 is installed in circumferencial groove 30 thereby to axially fix ball member 27a on shaft 15 and to prevent the ball member from moving axially outwardly on the shaft. Next, ball member 27b is received on its respective end of the shaft and is moved axially inwardly for reception in its race 25b. Thrust collar 33b and thrust plate 35b are installed on the shaft and brought into engagement with the outer end of ball member 27b. Then, push nut 37 is then applied to the end of shaft 15 with ball member 27a in firm engagement with its respective race 25a. The push nut is firmly moved axially inwardly on shaft 15 so as to retain both of the ball members in their desired socketed positions socketed in their races thereby to rotatably journal the rotor assembly on the races and to axially fix the rotor assembly relative to the races. It will further be understood that due to the part-spherical surfaces of the ball members engaging their respective races that the bearings 23a and 23b serve to take up a limited amount of axial misalignment of the rotor assembly with respect to the stator assembly.

In view of the above, it will be seen that the several objects and features of this invention are achieved and other advantageous results attained.

As various changes could be made in the above constructions and methods without departing from the scope of the invention, it is intended that all matter contained in the above description or shown in the accompany drawing shall be interpreted as illustrative and not in a limiting sense.

We claim:

1. The method of assembling an electric motor having a stator assembly including a core having a bore therethrough, a rotor, a shaft extending axially from said rotor in opposite directions, and a pair of bearing support members secured to said core for journalling said shaft for rotation about its axis with the rotor being rotatable within said bore, said method comprising the steps of:

inserting said rotor in said bore with said shaft extending outwardly therefrom;

installing a pair of said bearing support members on said core, each of said bearing support members having an opening therethrough for reception of a respective portion of said shaft and having an outwardly opening tapered race surrounding said shaft;

fixing a first ball member in axial position on said shaft, said first ball member having a surface thereon adapted to be journalled in its respective race for the transfer of both radially loads and axial thrust loads in one axial direction from said shaft to said stator assembly;

installing a second ball member on said shaft, said second ball member having a surface thereon adapted to be journalled in its respective race for the transfer of both radial loads and axial thrust loads in the opposite direction from said first ball member;

seating said first ball member in its race;

seating said second ball member in its race; and axially securing said second ball member relative to said shaft thereby to substantially prevent axial movement of said shaft and said rotor relative to said stator assembly.

* * * * *